Jan. 24, 1956  F. TYE  2,731,901
MACHINE FOR PUTTING FLUID FERTILIZER INTO THE SOIL
Filed July 30, 1953  4 Sheets-Sheet 1

INVENTOR.
Fred Tye
BY
*Truhlwells*
Atty.

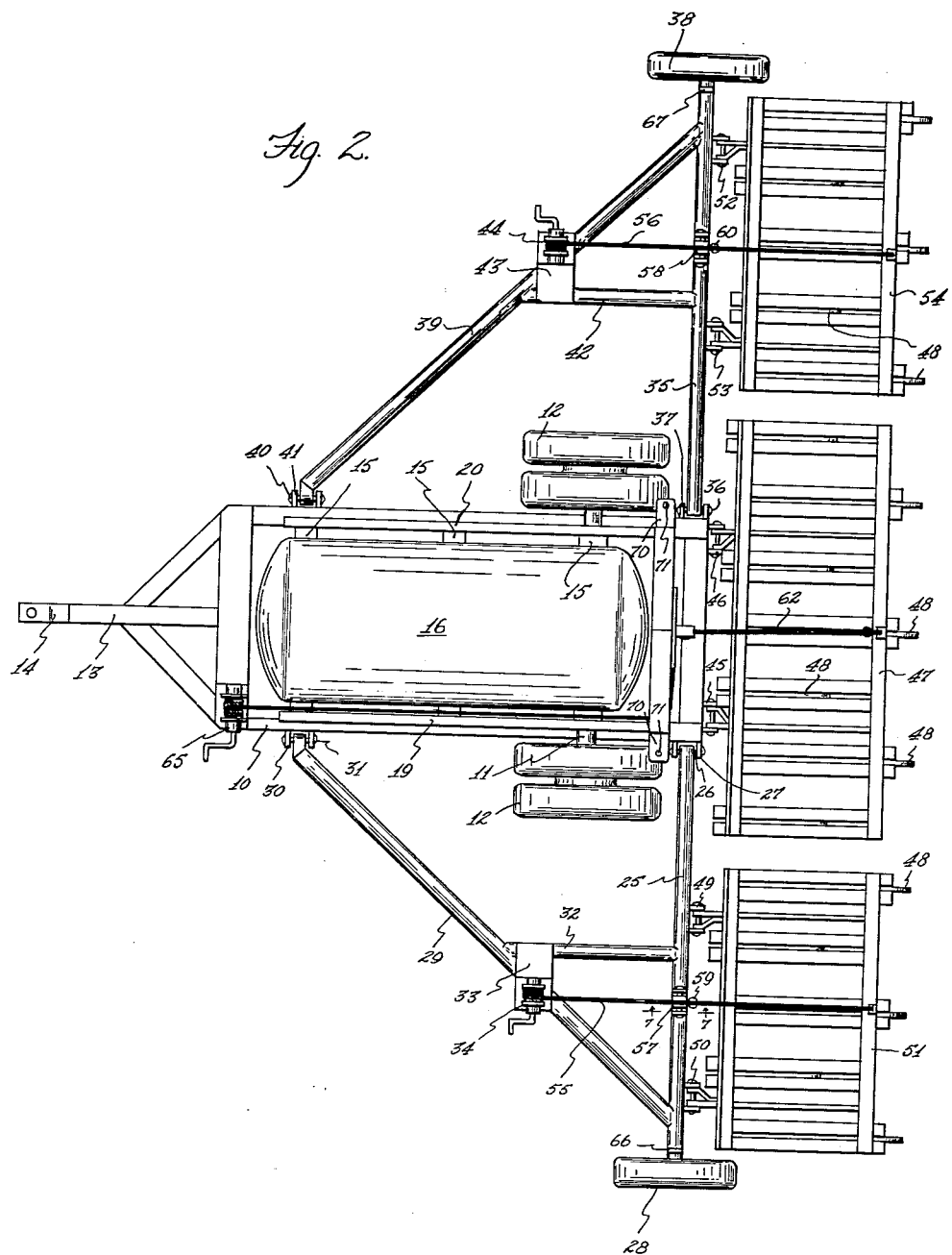

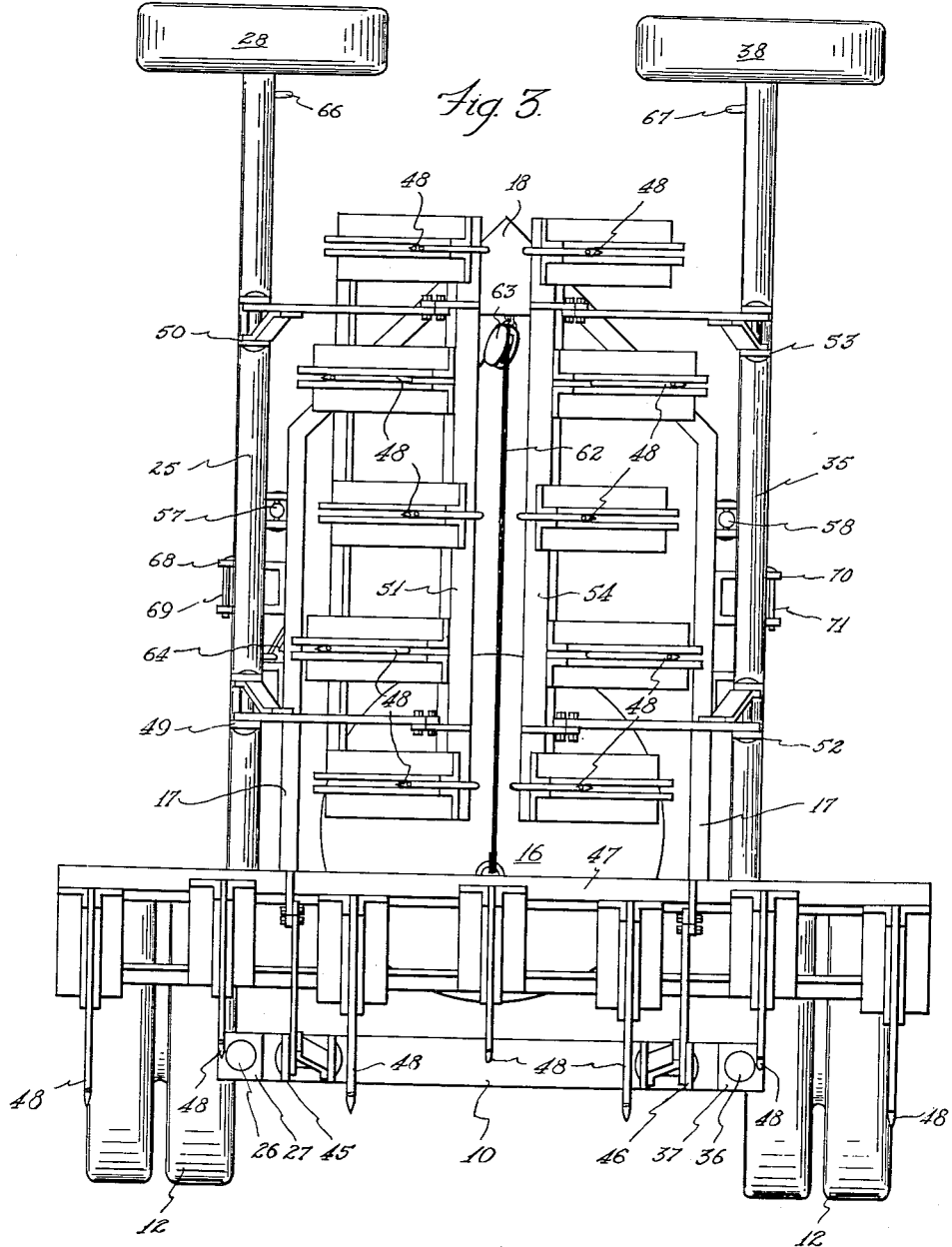

Jan. 24, 1956 F. TYE 2,731,901
MACHINE FOR PUTTING FLUID FERTILIZER INTO THE SOIL
Filed July 30, 1953 4 Sheets-Sheet 4
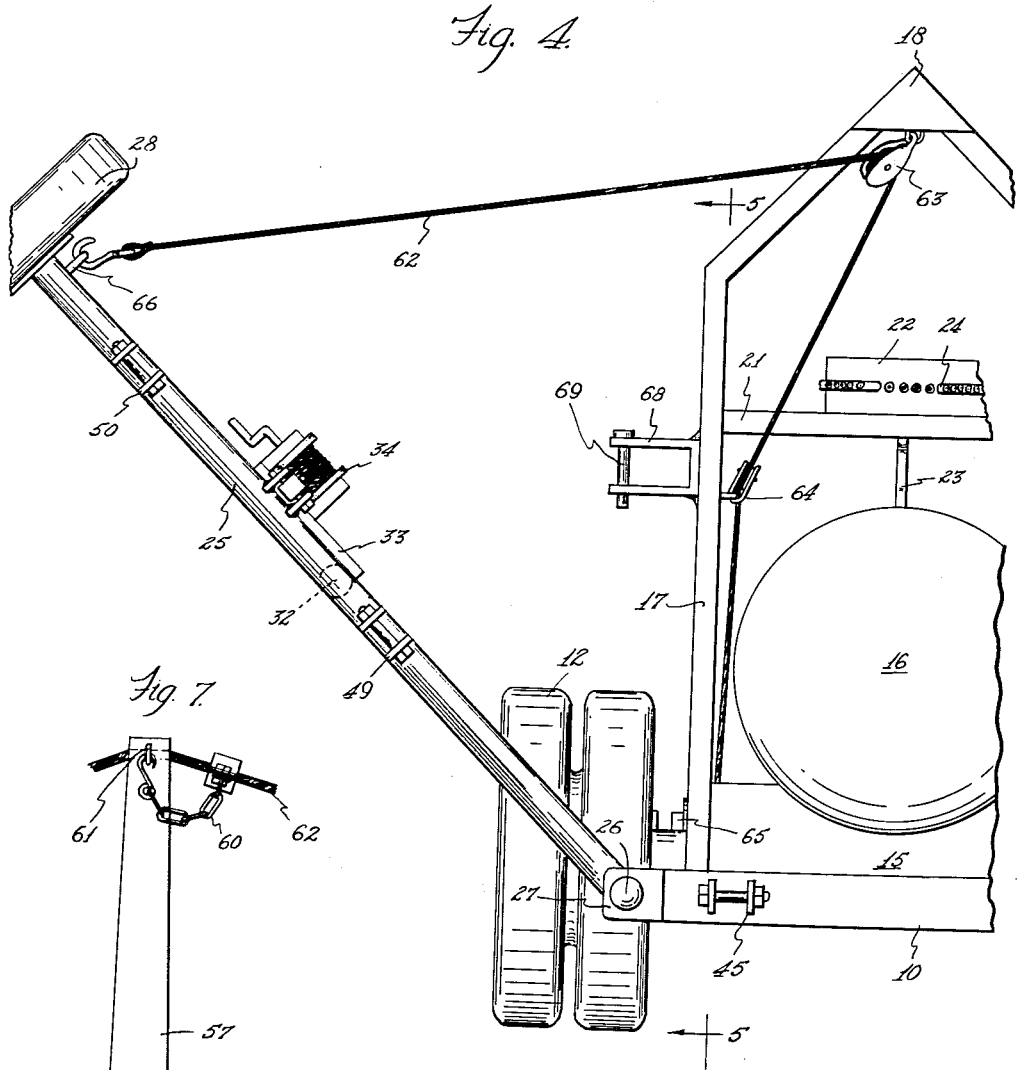
INVENTOR.
Fred Tye
BY GreekWells
Atty.

United States Patent Office 2,731,901
Patented Jan. 24, 1956

2,731,901
MACHINE FOR PUTTING FLUID FERTILIZER INTO THE SOIL

Fred Tye, Endicott, Wash.

Application July 30, 1953, Serial No. 371,210

4 Claims. (Cl. 97—235)

My invention relates to a machine for putting fluid fertilizer into the soil. One of the present means of fertilizing farm lands is to utilize a highly concentrated fluid fertilizer such as a nitrogen gas and to place this fertilizer in the soil by conducting it through small tubes downward along the back of a soil penetrating bar or point that extends into the soil at a forward angle so that the soil will fall down immediately back of the point and entrap the fluid fertilizer. The gaseous fluid is contained in a large tank under pressure and the flexible tubular connections from the tank to the several points are supplied by a distributor unit which is connected to the tank by a main conduit.

It is the purpose of my invention to provide a novel machine for mounting the tank and the several soil penetrating bars in such a fashion that they may be spread out to arrange the bars side by side for travel over a field or raised and folded together for transportation from one field to another. It is desirable to have a machine of this character which can carry enough of the soil penetrating bars to fertilize a rather wide swath. The width of the machine makes it impractical for transportation along the highway or between fields. Also the width of the machine is such that some articulation is necessary to adapt it to uneven conditions of the ground which might bring some of the soil penetrating bars out of the soil when others are at the proper depth.

My invention contemplates a machine wherein the soil penetrating bars are mounted on three frames and the three frames are pivoted to a trailer vehicle which is composed of a center section that carries the tank of gas and two side sections, each supported at the outer ends by a wheel and supported at their inner ends on the center section for pivotal movement.

More specifically it is a purpose of my invention to provide a machine of the character described above wherein the supply tank is supported on a central trailer unit which also mounts a center frame for carrying a plurality of soil penetrating bars for swinging movement up and down about a transverse axis, together with two side frames hinged to the first main frame at the sides thereof to fold up into a vertical position, an upright frame to which the side frames are fastened when raised, each of the side frames mounting individually a framework for carrying another series of soil penetrating bars, and cable means on each of the side frames and the center frame for controlling the depth to which the soil engaging bars may go.

The nature and advantages of my invention will appear more fully from the following description and the accompanying drawings illustrating a preferred form of the invention. It should be understood, however, that the drawings and description are illustrative only and are not intended to limit the invention except insofar as it is limited by the claims.

In the drawings:

Figure 2 is a plan view of the machine with the parts in the normal operating position;

Figure 3 is a rear view of the machine showing the parts in the position occupied for transportation of the machine from one field to another;

Figure 4 is an enlarged partial rear view of the machine with the soil engaging bar carrying frames removed and showing the means by which the parts are moved from the position shown in Figure 2 to the position hsown in Figure 3;

Figure 7 is an enlarged fragmentary sectional view taken on the line 7—7 of Figure 2.

Figure 1:
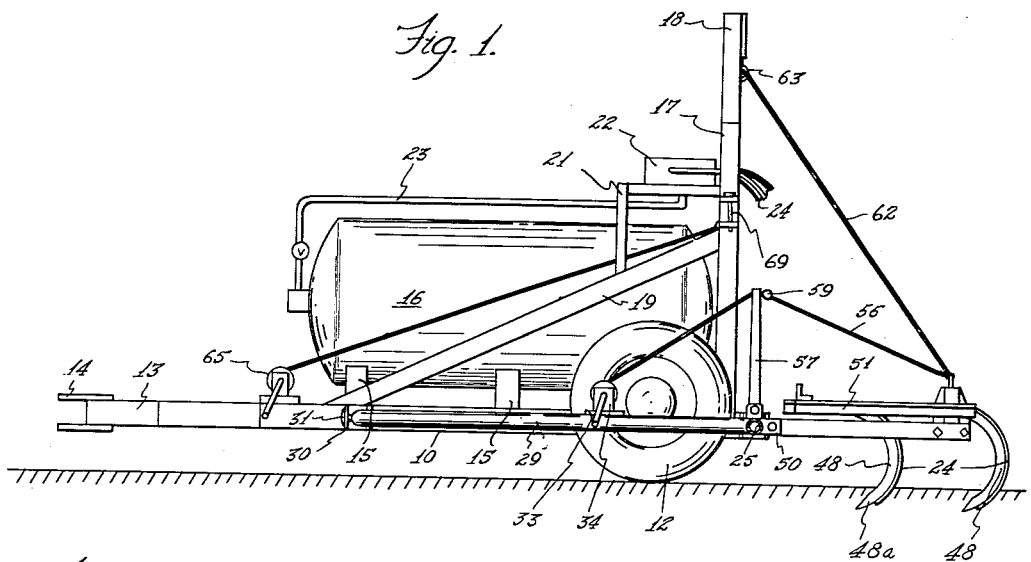
Figure 1 is a view in side elevation of a machine embodying my invention.

Referring now in detail to the drawings and in particular to Figures 1 and 2, my invention is embodied in a machine which has a central elongated frame 10 that is suspended near its rear end from an axle 11 which is supported by wheels 12. At the front end of the frame 10, there is a tow bar 13 which is provided with a clevis 14 for attachment to the draw bar of a tractor or other powered vehicle. The frame 10 has cross members 15 to support the tank 16. The tank 16 is the supply tank for supplying the gases or fluid fertilizer which is to be applied to the soil.

At the rear end of the frame 10 there is an upright frame 17 which has an A-shaped top portion 18. The upright frame 17 is connected by braces 19 and 20 to the frame 10. The braces 19 and 20 and the upright frame 17 mount a distributing platform 21 which carries a distributor head 22 for distributing the fluid fertilizer from a main conduit 23 to a multiplicity of small flexible conduits 24 that conduct the fluid fertilizer to the several points at which it is discharged into the soil. The particular construction of the distributor 22 and its connection to the tank and to the several soil engaging bars is well known and does not form any part of my invention. It is therefore shown only generally in the drawings.

There are two side frames pivotally supported by the main frame 10. As shown best in Figure 2, the left hand side frame comprises a rear tubular bar 25 that is connected by a pivot pin 26 to a bracket 27 at the rear end of the frame 10 and rearwardly of the upright frame 17. The bar 25 is supported at its outer end by a wheel 28. A diagonal tubular bar 29 is pivoted at its front end by a pivot pin 30 and a bracket 31 to the main frame 10. The bar 29 is welded to the bar 25 adjacent to the wheel 28. A tubular bracing bar 32 connects the bars 25 and 29 intermediate their ends. At the junction of the brace bar 32 with the bar 29, I mount a platform 33 and a cable winch 34.

The right hand frame shown in Figure 2 comprises a rear tubular bar 35 which is pivoted to the main frame by a pivot pin 36 and a bracket 37. A wheel 38 supports the outer end of the bar 35. A tubular bar 39 is pivoted to the front end of the frame 10 by a pivot pin 40 and a bracket 41. The bar 39 is welded to the bar 35 adjacent to the wheel 38. A tubular bracing bar 42 connects the bars 35 and 39 intermediate their ends. A platform 43 is supported by the bars 39 and 42 and mounts a cable winch 44.

The frame 10 has two brackets 45 and 46 at its rear end which pivotally mount a framework 47 which carries a multiplicity of soil penetrating bars 48. These bars 48 have the small flexible tubular members 24 extending along their back surfaces and beneath the forwardly extending portions 48a so as to deliver the fluid fertilizer immediately to the rear of and beneath the bars 48. The soil falls down as the bar passes through it and entraps the fluid fertilizer in the soil. The tubular bar 25 has brackets 49 and 50 thereon which pivotally mount a framework 51 which also carries ground engaging bars 48. The tubular bar 35 has brackets 52 and 53 which mount a framework 54 that also carries the soil engaging bars 48.

It will be appreciated that the soil penetrating bars 48, because of their shape, will tend to draw deeper into the soil. The winches 34 and 44 are connected to the frameworks 51 and 54 by cables 55 and 56 that extend over posts 57 and 58 that are supported on the tubular bars 25 and 35 respectively. The cables 55 and 56 are secured to the rear ends of the frameworks 51 and 54 and extend up through channels in the posts 57 and 58. Each of the cables carries a block 59 thereon which is fixed to the cable by clamping at the proper distance from the framework 51 or 54 to determine the depth to which the bars 48 will be permitted to penetrate. The posts 57 and 58 are pivoted to the bars 25 and 35 so that they may swing forward but may not swing rearward beyond the upright position. Chains 60 connect the blocks 59 to hooks 61 on the respective posts 57 and 58.

The middle framework 47 is supported at its rear end by a cable 62. The cable 62 extends upwardly to the top portion 18 of the upright frame 17 and passes over a sheave 63 that is suspended from the portion 18. The cable then extends downwardly to a second sheave 64 that is fastened on one side member of the frame 17, and from the sheave 64 forwardly to a winch 65 which is mounted on the front of the frame 10.

Figure 5:
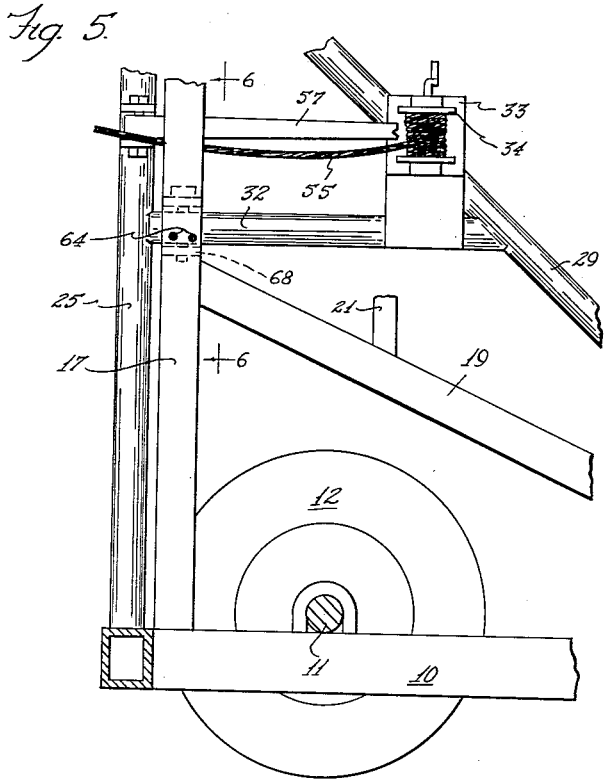
Figure 5 is a fragmentary sectional view taken on the line 5—5 of Figure 4, showing the side frame raised to transport position.
Figure 6:
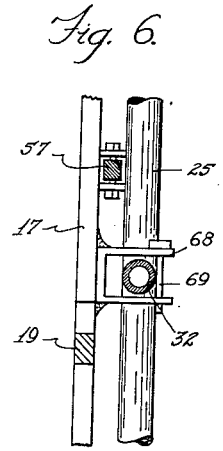
Figure 6 is a fragmentary sectional view taken on the line 6—6 of Figure 5.

The three cables 55, 56 and 62 constitute the means for lifting the frameworks 47, 51 and 54 whenever it is desired to lift them out of the ground. The cables are also utilized in raising the side frames into the upright position for transporting the machine. As illustrated best in Figures 3, 4 and 5, when it is desired to adapt the machine for transport, the cable 62 is unhitched from the framework 47 and hooked into one of the loops 66 or 67 that are provided on the bars 25 and 35 respectively. Utilizing the cable 62 as illustrated in Figure 4, the bar 25 is raised to upright position. In this position the brace bar 32 seats in a bracket 68 that is provided on the upright frame 17. A pin 69 is utilized to lock the brace bar 32 in place. In a similar manner the side bar 35 can be raised and locked in place by engaging the brace bar 42 in a bracket 70 and securing it by a pin 71. The cables 55 and 56 and the blocks 59 and 60 are utilized to pull the posts 57 and 58 forwardly until they lie parallel to the brace bars 32 and 42. When the two side frames are in elevated position, the frameworks 51 and 54 can swing toward each other as illustrated in Figure 3 and may be tied together in any suitable fashion for transportation. Once the side frames are locked in elevated position, the cable 62 can again be engaged with the framework 47 to hold it in the raised position illustrated in Figure 3 so that the entire vehicle is arranged in a compact unit for traveling from field to field or along the highway.

It is believed that the nature and advantages of my invention will be clear from the foregoing description.

Having thus described my invention, I claim:

1. In a machine of the class described, an elongated central frame having parallel side frame pieces and having means at the front end for attaching it to a towing vehicle, wheels supporting the rear end of said frame, an upright frame at the rear end of said frame and side frame members extending upwardly and rearwardly from the forward portion of the central frame to the upright frame, and forming with the upright frame and central frame a trailer vehicle, two laterally extending frames hinged to the side frame pieces of said central frame, means on the central frame to swing the laterally extending frames into upright position, means on the upright frame to secure the laterally extending frames in upright position, said laterally extending frames having rear frame pieces extending outwardly from the rear end of the central frame, a wheel supporting the outer end of each laterally extending frame, a framework hinged to and trailing each frame and having soil penetrating bars thereon, and means on each frame for lifting the framework hinged thereto about the hinges.

2. In a machine of the class described, an elongated wheel supported central frame, two triangular frames, one at each side of the central frame, the rear frame pieces of the triangular frames extending outwardly from the rear end of the central frame, the said triangular frames being hinged to the central frame so they may swing up and down between a horizontal and a vertical position, an upright frame fixed to the central frame at its rear end, soil penetrating bar carrying frameworks hinged to the rear sides of said triangular frames, another soil penetrating bar carrying framework hinged to the rear end of the central frame, means on the upright frame for securing the triangular frames thereto when they are raised to vertical position, manually operable means on each frame for lifting the framework hinged thereto about its hinges, and a wheel supporting the outer end of each triangular frame.

3. In a machine of the class described, an elongated central frame having parallel side frame pieces and having means at the front end for attaching it to a towing vehicle, wheels supporting the rear end of said frame, an upright frame at the rear end of said frame and side frame members extending upwardly and rearwardly from the forward portion of the central frame to the upright frame, and forming with the upright frame and central frame a trailer vehicle, two laterally extending frames hinged to the side frame pieces of said central frame, said laterally extending frames having rear frame pieces extending outwardly from the rear end of the central frame, a wheel supporting the outer end of each laterally extending frame, a framework hinged to and trailing each frame and having soil penetrating bars thereon, a winch on the forward portion of each frame, a cable attached to the rear portion of the bar carrying framework hinged thereto and wound on the winch on the corresponding frame, the upright frame having a cable guide sheave adjacent the top guiding the cable attached to the framework that is hinged to the central frame and the laterally extending frames having posts provided with cable guides thereon over which pass the cables attached to the frameworks hinged to said last named frames.

4. In a machine of the class described, an elongated wheel supported central frame, two triangular frames, one at each side of the central frame, the rear frame pieces of the triangular frames extending outwardly from the rear end of the central frame, the said triangular frames being hinged to the central frame so they may swing up and down between a horizontal and a vertical position, an upright frame fixed to the central frame at its rear end, soil penetrating bar carrying frameworks hinged to the rear sides of said triangular frames, another soil penetrating bar carrying framework hinged to the rear end of the central frame, means on the upright frame for securing the triangular frames thereto when they are raised to vertical position, manually operable means on each frame for lifting the framework hinged thereto about its hinges, and a wheel supporting the outer end of each triangular frame, said last named means comprising an upright post pivoted to the rear side of each triangular frame, a cable guide at the top of each post, a winch on the forward side of each triangular frame and having a cable wound thereon, said cable extending rearwardly over said upright post in said cable guide, the end of the cable being attached to the bar carrying framework hinged to the triangular frame, and a block fixed to the cable behind the upright post, whereby to contact the cable guide and force the post to pivot forwardly when the framework is pivoted up about its hinges.

References Cited in the file of this patent

UNITED STATES PATENTS

| | | |
|---|---|---|
| 519,321 | Cochran | May 8, 1894 |
| 1,190,683 | Stroud | July 11, 1916 |
| 1,927,458 | Klise | Sept. 19, 1933 |
| 1,963,426 | Taylor | June 19, 1934 |
| 2,650,556 | Turner | Sept. 1, 1953 |